United States Patent [19]
Sackler et al.

[11] Patent Number: 5,235,507
[45] Date of Patent: Aug. 10, 1993

[54] HEALTH INSURANCE MANAGEMENT SYSTEM

[75] Inventors: Arthur F. Sackler, Brooklyn, N.Y.; Marshall Levin, Lawrenceville, N.J.

[73] Assignee: P. B. Toau and Company, Ltd., New York, N.Y.

[21] Appl. No.: 464,972

[22] Filed: Jan. 16, 1990

[51] Int. Cl.$^5$ ............................ G06F 7/00; G06G 7/52
[52] U.S. Cl. .................................................. 364/401
[58] Field of Search ................ 364/401, 406, 413.01, 364/408

[56] References Cited
U.S. PATENT DOCUMENTS 4,491,725  1/1985  Pritchard ..................... 364/406

OTHER PUBLICATIONS

Data Sources, 1989, Computer Associates International, Inc., p. J-400 to J-404.

Primary Examiner—Roy N. Envall, Jr.
Assistant Examiner—Ari M. Bai
Attorney, Agent, or Firm—Hopgood, Calimafde, Kalil, Blaustein & Judlowe

[57] ABSTRACT

Data processing for a health insurance management system verifies the insurance status of the claimant, identifies the appropriate insurance policy, calculates the amount to be paid to the health care provider, pays the provider, calculates the payment required by the claimant, if any, and debits the account of the claimant in the amount required. A claim may be processed under more than one policy where appropriate. The system can handle both individual and family insurance policies.

4 Claims, 4 Drawing Sheets

HEALTH INSURANCE MANAGEMENT SYSTEM

BACKGROUND OF THE INVENTION

This invention relates to a health insurance management system, and more particularly to a method and apparatus for processing health insurance claims using a computer program.

In the past, health insurance was almost exclusively the province of insurance companies which would issue a traditional reimbursement for services under a single set of master policy criteria. Recently, rising health care costs have driven many employers to become self-insured, leading to a proliferation of policy types, multiple coverage (accelerated by dual wage earner families) and wide variations in reimbursement and payment practices. However, self-insurers who are not in the insurance business are burdened by the administrative tasks associated with the processing of health insurance claims. This has caused the birth of a new industry devoted to assisting self-insurers in insurance-related administrative tasks. In addition to management companies specializing in this area, the insurance companies themselves have begun administering self-insurance plans for clients on a fee basis. Presently, more than half of all claims adjudicated by insurance companies (over $30 billion) were processed as the administrator of self-insured plans on a fee basis.

Management and insurance companies devoted to servicing a number of self-insurers must keep track of the different policies in effect at each client self-insurer company, the insured parties for each self-insurer, the claims filed for each individual within each client company, etc., so that when a claim is filed it can be processed correctly and efficiently. The greater the efficiency of the processing system, the greater will be the cost-effectiveness of the management company; greater cost-effectiveness in turn makes self-insurance administration more competitive relative to the services traditionally offered by the insurance companies.

As the volume of their business has increased, many insurance management companies have begun using computerized systems to more efficiently and quickly handle health insurance claims for their clients. However, the systems now in effect are of limited efficiency, in part because they require a great deal of input from human operators each time a claim is processed.

SUMMARY OF THE INVENTION

A health insurance management system is provided which includes means for entering claim data, means for verifying the insurance status of the claimant, means for identifying the appropriate insurance policy, means for calculating the amount to be paid to the health care provider, means for paying the provider, means for calculating the payment required by the claimant, if any, and means for debiting the account of the claimant.

DESCRIPTION OF THE PREFERRED EMBODIMENTS

The system of this invention preferably includes a computer program and an associated data base which supplied the necessary information to the program after the initial data input is completed. The data base typically contains information on insured individuals, on the essential provisions of the health insurance policies covering each individual, and on which health care providers are authorized to perform services under each policy.

Figure 1A:
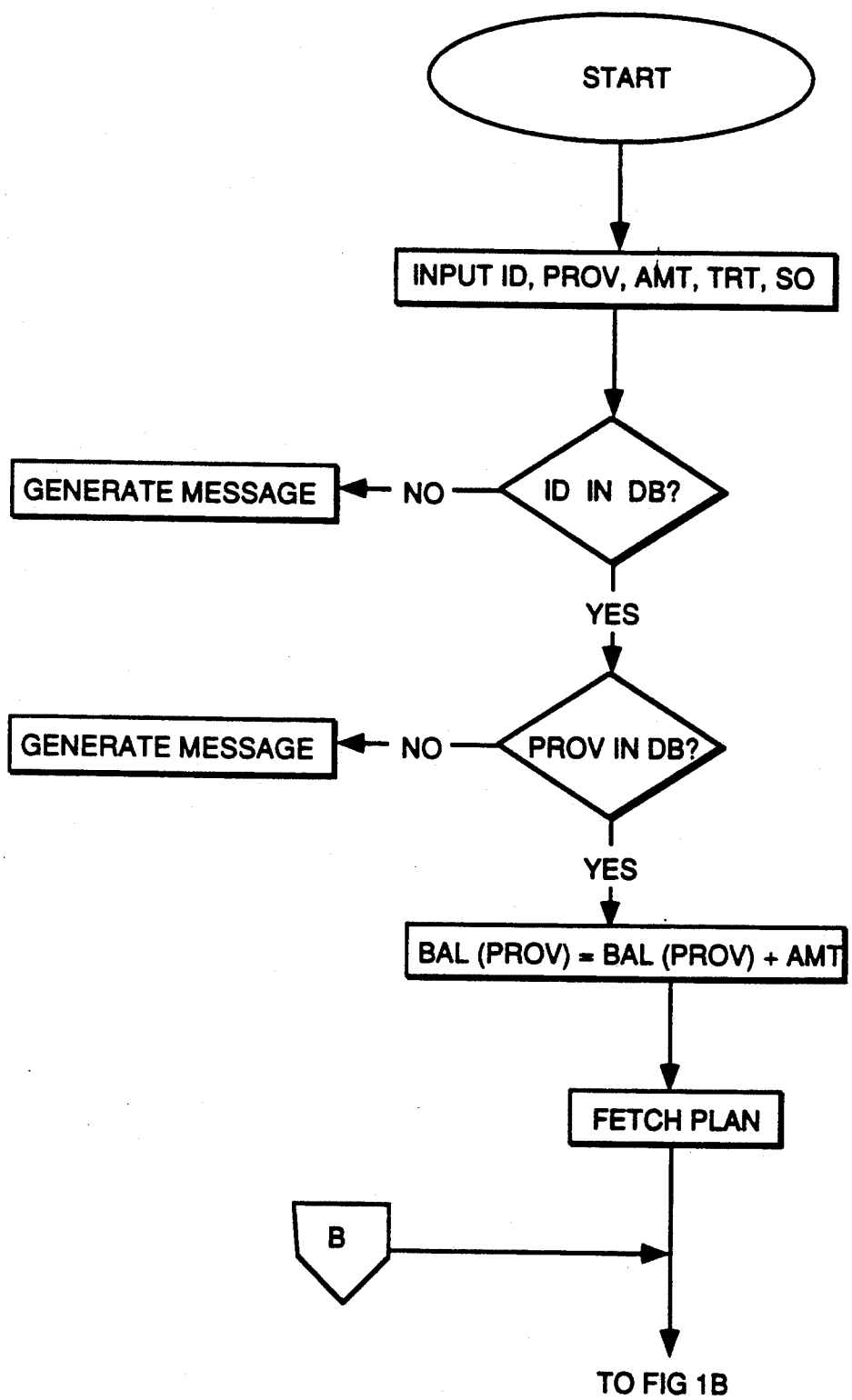
FIGS. 1A, 1B, 1C and 1D together illustrate the flow chart of a computer program for use in one embodiment of a system according to the present invention.
Figure 1B:
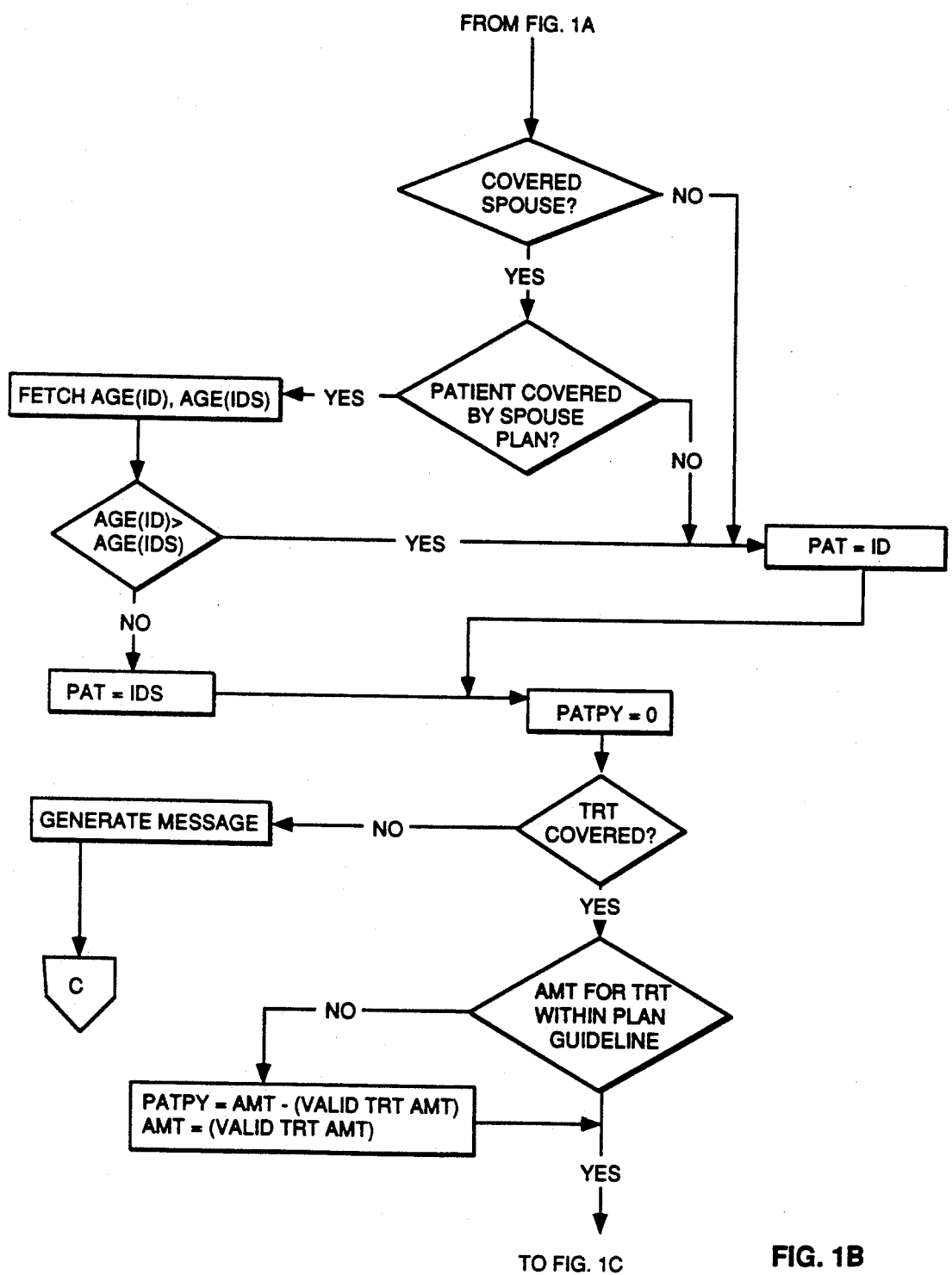
Figure 1C:
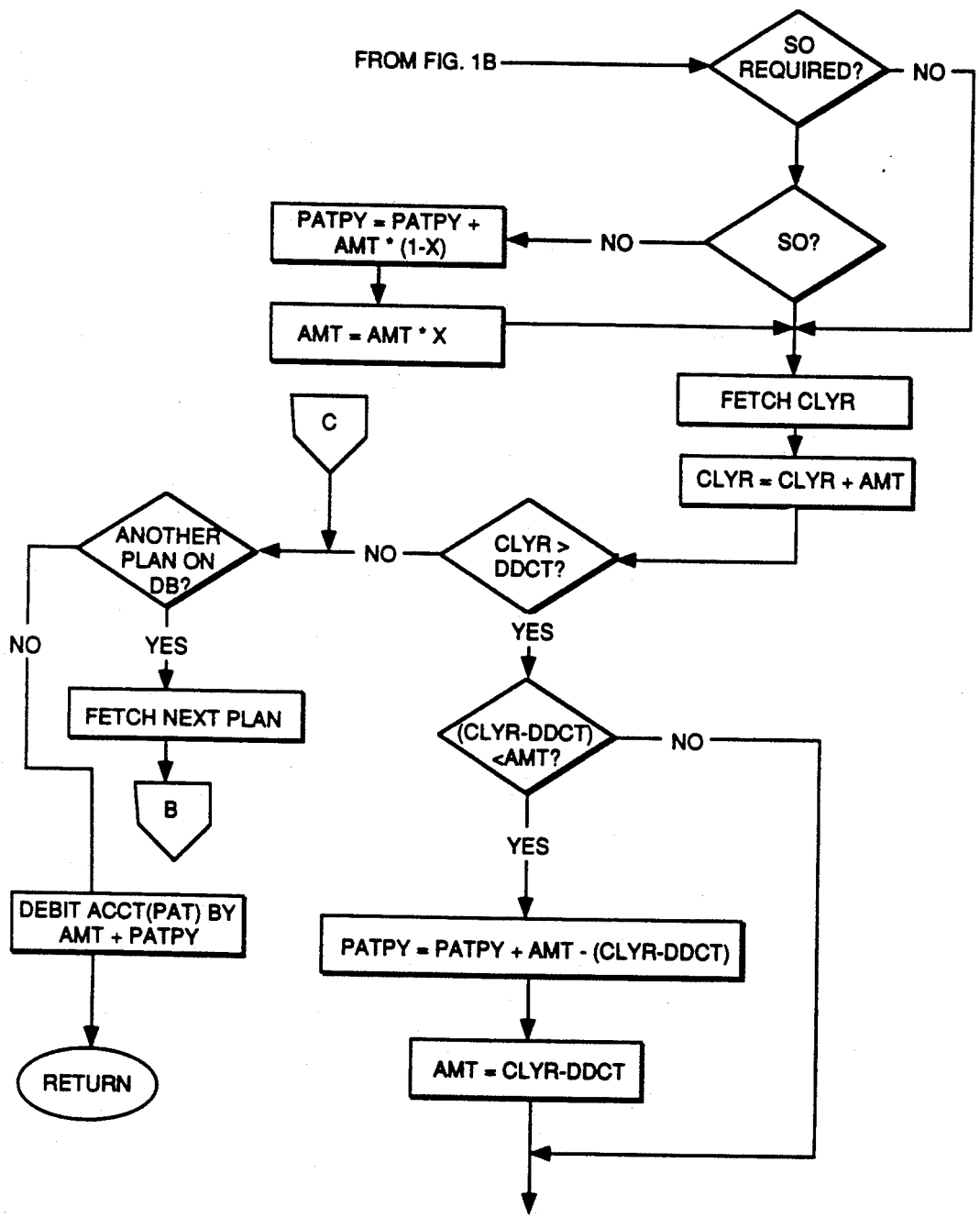
Figure 1D:
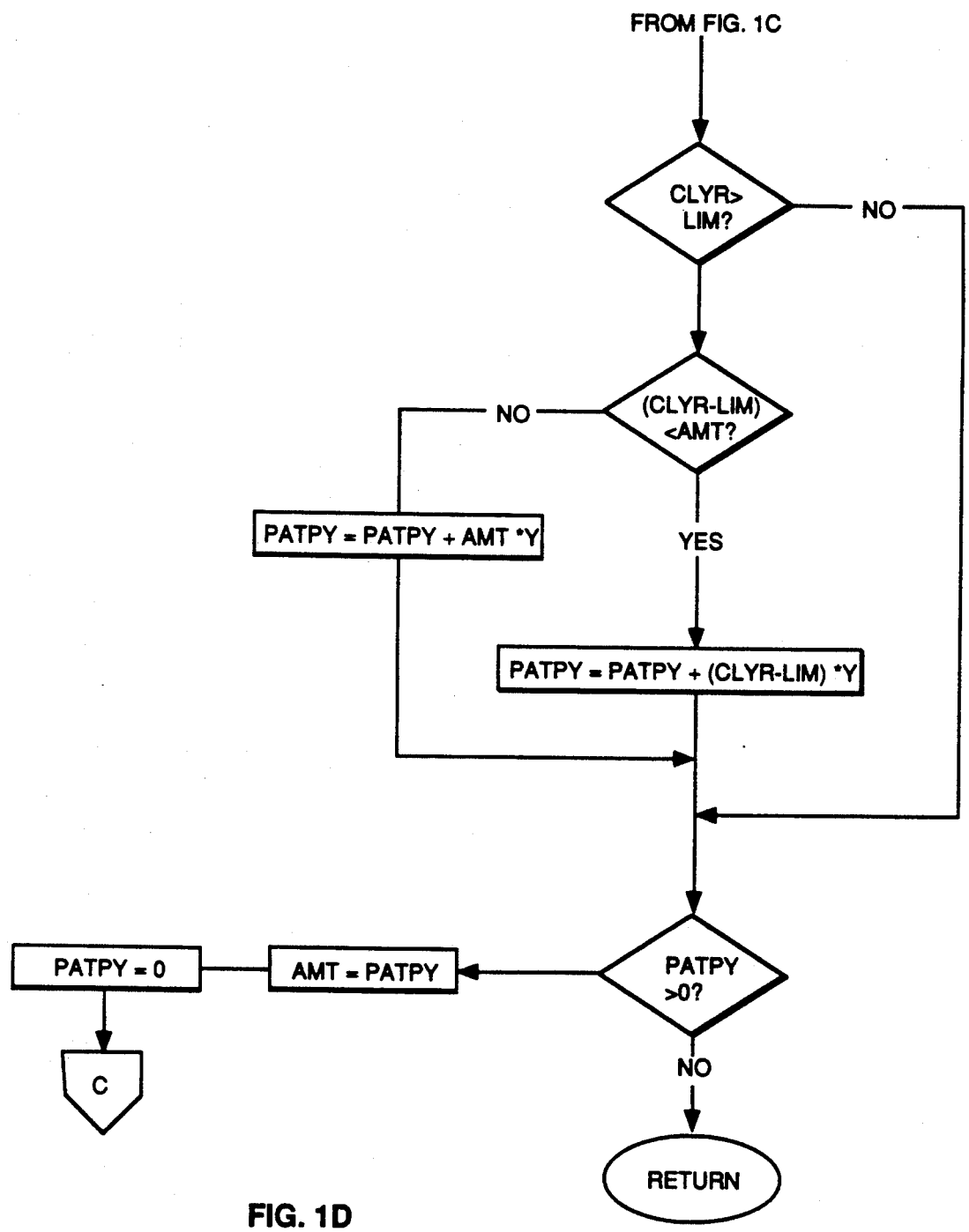

Referring to FIGS. 1A-1D, in one embodiment of a computer program for use in a system according to the present invention the processing of a health insurance claim begins with the input of the identity of the insured individual (ID), the identity of the health care provider (PROV), the amount of the claim (AMT), the treatment provided (TRT), and whether a second opinion was obtained prior to treatment (SO). The program then compares the ID to the computer data base (DB) to see if the ID is valid; if it is not, an appropriate message is generated and processing ends. If the ID is in the data base, the PROV is then similarly checked against the DB files. If the PROV is valid, the amount (AMT) to be paid to the PROV is credited to the provider's account (BAL(PROV)). The program then fetches from the data base the insurance policy (PLAN) covering the individual.

If the ID has a spouse who is also covered (IDS), and if the patient is covered under the spouse's plan, the program fetches and compares the ages (AGE(ID)) and (AGE(IDS)) of the couple, and treats the older spouse as the patient treated (PAT) for the purpose of allocating payment amounts.

The treatment (TRT) is checked against the policy. If the TRT is not covered, a message is generated and processing under that policy ends, although, as is discussed below, the program provides for processing under another policy if one is available. If the AMT exceeds the maximum payable amount (valid TRT AMT) for this treatment (TRT) under the policy, the AMT is set equal to the valid TRT AMT and the excess is set aside for payment by the patient (PATPY).

The program checks the plan to see if a second opinion (SO) is required. If a second opinion (SO) is required and was not obtained, the claim amount (AMT) is reduced by multiplying by a fraction (X) according to the policy's provisions, and the amount of the reduction is added to the patient's co-payment amount (PATPY).

The program fetches from the DB the total claims for the past year (CLYR) for PAT and updates this amount by adding to it the AMT. If the updated CLYR is not greater than the annual deductible (DDCT) under the policy, the program searches the DB for another plan covering the PAT. An important feature of the system is its ability to handle more than one plan per individual, e.g., a primary plan and a secondary plan. If there is another plan, that plan is fetched and processed as was the primary plan. If not, the patient's account (ACCT-(PAT)) is debited by the AMT plus PATPY and processing ends.

If the CLYR exceeds the DDCT, but the difference CLYR−DDCT is less than AMT, the quantity [AMT−(CLYR−DDCT)] is added to PATPY; AMT then is set equal to the difference CLYR−DDCT.

If the CLYR is greater than the co-insurance limit (LIM), the amount of co-insurance chargeable to the PAT must be calculated and added to PATPY. If the difference CLYR−LIM is greater than or equal to the AMT, the entire AMT is subject to co-insurance, and PATPY is increased by AMT times a policy-determined co-insurance fraction (Y). If this difference is less than AMT, PATPY is increased instead by the amount of the difference times the co-insurance fraction. (Under some plans, the PATPY may be increased by a policy-determined constant amount instead of a variable fraction (Y).) At this point, if PATPY is zero processing ends without debiting the patient's account (ACCT-(PAT)). If PATPY is greater than zero, however, this amount is processed against any other plan(s) covering the patient before the ACCT(PAT) is debited.

Some plans have two deductibles, a family deductible and an individual deductible. In that event, both a family CLYR and an individual CLYR must be updated, each CLYR compared to its corresponding DDCT and the smallest of the two values CLYR−DDCT is used to calculate the debit amounts.

To obtain coverage, children, spouses or other dependents must be enrolled as eligible on each plan. This information will be an integral part of the DB and may be considered part of the ID.

This program is suitable where there for directly charging a patient's account, for example, by charging payments to the patient's credit card or checking account. There may be a limit to how much can be charged to the patient's account, or the patient may wish to impose such a limit, or perhaps current authorization may be lacking. The program easily may be modified to bill the patient for unchargeable amounts.

It may be desirable to debit an insurer's account for the amount of the claim minus the amount charged to the patient's account. This can be done easily. For example, after the AMT is credited to BAL(PROV), an auxiliary variable could be set equal to AMT; this auxiliary variable would be reduced by the amount charged to the patient's account and at the end of the program the reduced value would be charged to the insurer's account.

The present invention provides a method and apparatus for quickly and efficiently processing health insurance claims. Using a computerized system according to this invention, a health insurance administrator or management company may easily and automatically process a large number of health insurance claims, even where the claims fall under different insurance policies.

Many variations of the system described and illustrated are possible and will occur to those skilled in the art. For example, a policy having a separate deductible amount for each treatment, and/or having different levels of co-payment, could be easily accommodated without altering the essential nature of the invention. The exact authorization and calculation steps needed depend upon the policy in effect; a program can be tailored to fit any health insurance policy or group of policies administered together. Those skilled in the art will understand how to create the necessary programming.

With minor modifications, the present invention may also be used for processing claims for non-health related insurance, such as automobile insurance, life insurance, or property insurance, for example.

The invention is not intended to be limited to the embodiments illustrated and described herein, but encompasses all embodiments and variations of the inventive method and apparatus which are consistent with this disclosure and falling within the scope of the appended claims.

What is claimed is:

1. A health insurance management system for processing claims associated with a plurality of individual accounts and a plurality of separate plans sponsored by one or more organizations for management by an employer or participant-based management group, comprising:

means for entering claim data corresponding to one of said plurality of individual accounts;

means for verifying an insured status of said account;

means for selectively determining a plan culled from a database of discrete plans corresponding to said account, and implementing a set of plan parameters defining plan attributes for processing said claim data;

data processing means for determining the relative payment of charges associated with said claim data by said sponsoring organization, a carrier and claimant wherein relative charges are one of the parameters in said set of plan parameters and said data processing means culls from a claimant database past charges accrued during a pre-defined periodic interval;

means for checking an authorization of a health care provider in accordance with said claim data; and means for paying the provider.

2. A system according to claim 1 further comprising means for debiting the account of the claimant.

3. A system according to claim 1 wherein said data processing means further comprises means for identifying one or more secondary policies covering the claim and means for processing the claim under said secondary policies.

4. A system according to claim 1 further comprising means for debiting the insurer's account.

* * * * *